United States Patent
Tang (10) Patent No.: US 12,550,117 B2
(45) Date of Patent: Feb. 10, 2026

(54) COORDINATION OF UP PATH CHANGE AND AF RELOCATION

(71) Applicant: LENOVO (BEIJING) LIMITED, Beijing (CN)

(72) Inventor: Tingfang Tang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 312 days.

(21) Appl. No.: 18/554,204

(22) PCT Filed: Apr. 6, 2021

(86) PCT No.: PCT/CN2021/085681
§ 371 (c)(1),
(2) Date: Oct. 6, 2023

(87) PCT Pub. No.: WO2022/213271
PCT Pub. Date: Oct. 13, 2022

(65) Prior Publication Data
US 2024/0196366 A1    Jun. 13, 2024

(51) Int. Cl.
*H04W 68/00* (2009.01)
*H04W 36/12* (2009.01)

(52) U.S. Cl.
CPC ........ *H04W 68/005* (2013.01); *H04W 36/12* (2013.01)

(58) Field of Classification Search
CPC .. H04W 68/005; H04W 36/12; H04W 40/248
See application file for complete search history.

(56) References Cited

U.S. PATENT DOCUMENTS

| | | | |
|---|---|---|---|
| 2019/0357301 A1* | 11/2019 | Li | H04W 40/20 |
| 2020/0323029 A1* | 10/2020 | Lu | H04W 76/25 |
| 2020/0404069 A1 | 12/2020 | Li et al. | |
| 2021/0195554 A1* | 6/2021 | Singh | H04W 60/04 |

FOREIGN PATENT DOCUMENTS

| | | |
|---|---|---|
| CN | 110049070 A | 7/2019 |
| CN | 110167003 A | 8/2019 |
| WO | 2020035357 A1 | 2/2020 |

OTHER PUBLICATIONS

PCT/CN2021/085681, "International Search Report and Written Opinion", International Searching Authority, Nov. 24, 2021, pp. 1-6.

\* cited by examiner

*Primary Examiner* — Tejis Daya
(74) *Attorney, Agent, or Firm* — Kunzler Needham & Hilton (57) ABSTRACT

Method and apparatus for AF relocation are disclosed. A method performed at an AF comprises receiving, from an SMF, target DN access location information when no DNAI of a target AF is received for DNAI change from the AF to the target AF; and retrieving the target AF according to the received target DN access location information.

20 Claims, 5 Drawing Sheets

COORDINATION OF UP PATH CHANGE AND AF RELOCATION

FIELD

The subject matter disclosed herein generally relates to wireless communications, and more particularly relates to improving coordination of UP path change and AF relocation.

BACKGROUND

The following abbreviations are herewith defined, at least some of which are referred to within the following description: New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), User Equipment (UE), Evolved Node B (eNB), Next Generation Node B (gNB), Uplink (UL), Downlink (DL), Central Processing Unit (CPU), Graphics Processing Unit (GPU), Field Programmable Gate Array (FPGA), Orthogonal Frequency Division Multiplexing (OFDM), Radio Resource Control (RRC), User Entity/Equipment (Mobile Terminal), TS (Technical Specification), Application Service Provider (ASP), Edge Data Network (EDN), Edge Enabler Server (EES), Application Function (AF), core network (CN), core network control plane (CN CP), Edge Application Server (EAS), data network (DN), DN Access Identifier (DNAI), 5G core (5GC), traffic routing information (TRI), Session Management (SM), Session Management Function (SMF), Internet Protocol (IP), Media Access Control (MAC), User Plane Function (UPF), Policy Control Function (PCF), Application Server (AS), Network Exposure Function (NEF), Single Network Slice Selection Assistance Information (S-NSSAI), Data Network Name (DNN), SUbscription Permanent Identifier (SUPI), Protocol Data Unit (PDU), PDU Session Anchor (PSA), Access and Mobility Management Function (AMF).

Edge platform is deployed for providing differentiated application services. The ASP (Application Service Provider) can deploy its application(s) into more than one END (edge data network). Each EDN can have its EES (Edge Enabler Server) with its service area as defined in 3GPP TS 23.558. The EES can be AF (Application Function) that interacts with 3GPP core network as described in 3GPP TS 23.501 and TS 23.502. In the following description, AF (EES) (e.g. AF1 (EES1), AF2 (EES2), . . . ) is described as AF that serves as EES.

Figure 1:
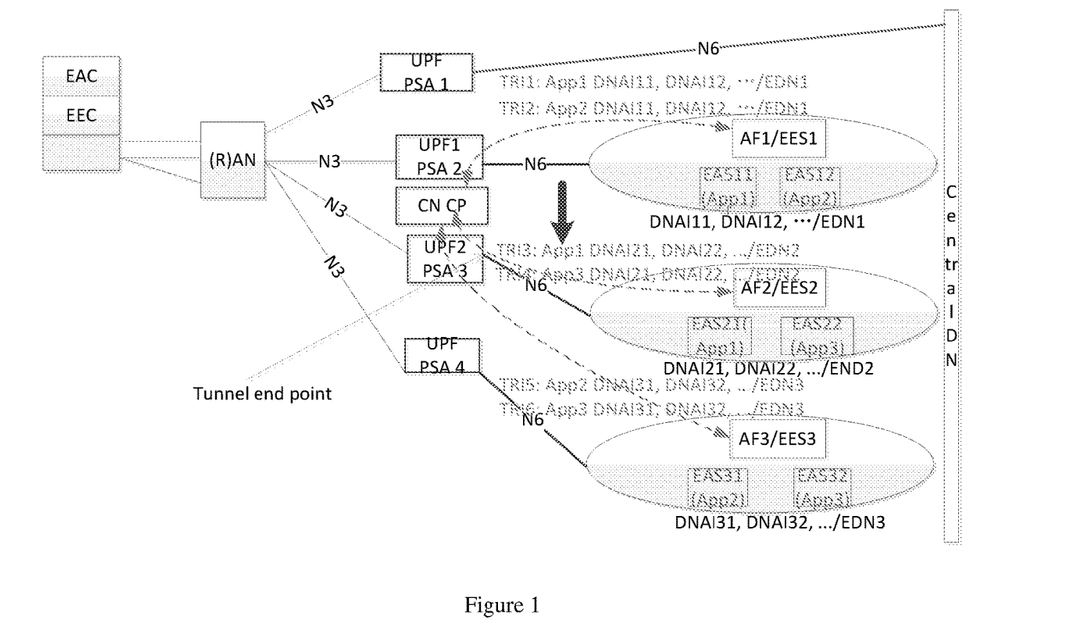
FIG. 1 illustrates distributed deployment of multiple AFs.

In the 3GPP work for edge computing, the scenario with multiple AFs is discussed and agreed into the conclusion of 3GPP TR 23.748, which involves the scenarios where Edge Application Server(s) and Application Function are located at the Edge Data Network, implying multiple AF instances, i.e. one (or more) local AF(s) and also a central AF. One example is shown in FIG. 1. TRI (e.g. TRI1, TRI2, TRI3, TRI4, . . . ) stands for the traffic routing information exchanged between AF and 5GC (5G core), which is AF traffic influence request information received from the AF. DNAI (e.g. DNAI11, DNAI12, DNAI21, DNAI22, . . . ) stands for the DN Access Identifier.

When AF relocation is triggered, the source AF (e.g. AF1) can retrieve target AF (e.g. AF2) according to target DNAI (i.e. DNAI of the target AF) and the UE location information based on the Retrieve Target EES procedure described in clause 8.8.3.3 of 3GPP TS 23.558.

However, when UP path change triggers AF relocation, e.g. changing from DNAI1x (e.g. DNAI11) to DNAI2x (e.g. DNAI21) for an application (e.g. App1), at the time of notification to the source AF (e.g. AF1) of DNAI change, if the traffic routing information (TRI) (e.g. TRI3, TRI4) with the list of DNAIs within EDN2 (which should be sent out by AF2(EES2)) has not been sent to the core network, from the SMF (SMF is not shown in FIG. 1, SMF is within "CN CP" in FIG. 1) point of view, it is the DNAI change from the UP path status where a DNAI (e.g. DNAI11) applies to a status where no DNAI applies. Accordingly, the target DNAI is not available when the source AF (e.g. AF1) receives notification of AF relocation from the SMF. The information needed for retrieving the target AF (e.g. AF2) is not available even if the application is deployed in the EDN2.

The purpose of the present invention is to improve the coordination of UP path change and AF relocation, especially when DNAI change happens from the UP path status where a DNAI (e.g. DNAI11) applies to a status where no DNAI applies.

BRIEF SUMMARY

Method and apparatus for AF relocation are disclosed.

In one embodiment, a method performed at an AF comprises receiving, from an SMF, target DN access location information when no DNAI of a target AF is received for DNAI change from the AF to a target AF; and retrieving the target AF according to the received target DN access location information.

In some embodiment, the method may further comprise transmitting N6 traffic routing details of the target AF to the SMF. The method may further comprise transmitting an indication on whether the target DN access location information is notified. The method may further comprise transmitting traffic routing information of the target AF. The target DN access location information may be target N6 CN tunnel information which is the route information of the tunnel end point in core network on N6 interface, or user location information obtained by the SMF.

In another embodiment, a method at an SMF comprises transmitting target DN access location information to a source AF when no DNAI of target AF is available for DNAI change from the source AF to the target AF.

In some embodiment, the method further comprises receiving N6 traffic routing details of the target AF from the source AF. The method may further comprise receiving traffic routing information from the target AF; and deciding notification to the target AF according to the received N6 traffic routing details of the target AF and the received traffic routing information. The method may further comprise receiving from the source AF an indication on whether the target DN access location information is notified, wherein the target DN access location information is transmitted when the indication is received. The target DN access location information may be target N6 CN tunnel information which is the route information of the tunnel end point in core network on N6 interface, or user location information obtained by the SMF.

In yet another embodiment, an AF comprises a processor; and a receiver coupled to the processor, wherein the processor is configured to receive, via the receiver, target DN access location information when no target DNAI is received for DNAI change from a source AF to the target AF; and to retrieve target AF according to the received target DN access location information.

In further embodiment, an SMF comprises a processor and a transmitter coupled to the processor, wherein the processor is configured to transmit, via the transmitter, target DN access location information when no DNAI of target AF is available for DNAI change from a source AF to the target AF.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including". "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

Figure 2:
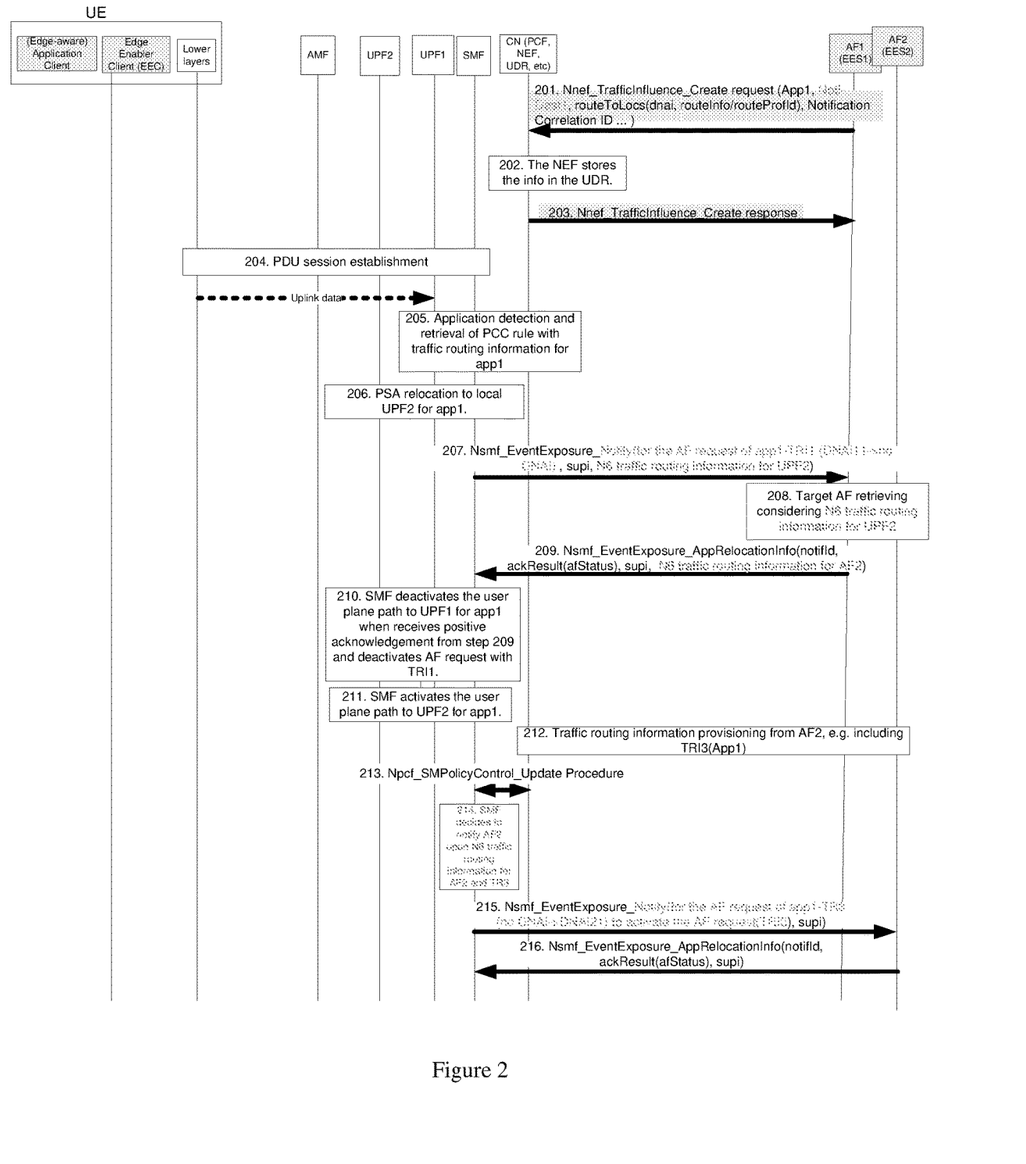
FIG. 2 illustrates procedures according to a first embodiment.

According to a first embodiment illustrated in FIG. 2, an N6 CN tunnel information is informed during User Plane Management Events notification.

It is assumed that: (1) ASP (Application Service Provider) deploys the service or application (e.g. app1) into multiple EDNs (Edge Data Networks), in each of which a different AF (e.g. AF1 or AF2) is located; (2) AF sends traffic routing information for the associated EDN for any UE per application (e.g. traffic routing information for app1); and (3) source AF (e.g. AF1) can retrieve target AF (e.g. AF2) according to related procedure for service continuity. The detailed steps of the first embodiment are described in detail as follows:

In step 201, an AF request (e.g. Nnef_TrafficInfluence_Create request) is sent from source AF (e.g. AF1) to the core network (CN) per application (e.g. for app1) without individual UE address (e.g. IP address or MAC address). The AF request may influence UPF selection or reselection and allow routing user traffic to a local access to a data network identified by a DNAI (e.g. DNAI11 for app1). The source AF (e.g. AF1) may send the AF request to PCF (e.g. via NEF to PCF). The AF request includes the identification of the application (App1 in FIG. 2), the traffic routing information (e.g. TRI1 for app1) (routeToLocs(dnai, routeInfo/routeProfId) in FIG. 2), the Notification Target Address pointing to the NEF or AF (Noti-Dest1 in FIG. 2), and the Notification Correlation ID containing the AF Transaction Internal ID if the AF request includes a notification reporting request for UP path change.

In step 202, the NEF stores the traffic routing information included in the AF request into UDR. Since the AF request has no UE address, the traffic routing information is stored with Data Key=(1) AF Transaction Internal ID, (2) S-NSSAI and DNN, and/or (3) Internal Group Identifier or SUPI.

In step 203, a: response message to the AF request (e.g. Nnef_TrafficInfluence_Create response) is sent to the source AF (e.g. AF1).

In step 204, the UE initiates a PDU session establishment procedure.

In step 205, the SMF detects the application (e.g. app1) for the UE, and retrieves the traffic routing information for the application (e.g. app1) (e.g. included in PCC rule) via the SM policy procedure using SM Policy Association Establishment procedure during the PDU session establishment procedure, or using SM Policy Control Update procedure based on the application detection.

In step 206, according to related traffic routing information, PSA relocation to local UPF2 (from UPF1) happens for the application (e.g. app1). When the PSA relocation happens, a condition for AF notification has been met.

In step 207, the SMF sends the AF notification (i.e. User Plane Management Events notification) (e.g. Nsmf_EventExposure_Notify) to the source AF (e.g. AF1) that subscribes to AF notification from the SMF.

The PSA relocation leads to DNAI change, e.g. from source DNAI (the DNAI of the DN accessed via UPF1 that is within the service area of the source AF) to target DNAI (the DNAI of the DN accessed by UPF2 that is within the service area of the target AF). In this condition, the AF notification sent from the SMF includes: source DNAI, source traffic routing information that indicates N6 traffic routing information for the source DNAI, target DNAI, and target traffic routing information that indicates N6 traffic routing information for the target DNAI. In this condition, the target DNAI is known to the SMF. For example, if the PSA relocation leads to DNAI change from DNAI11 to DNAI21 while both DNAI11 and DNAI21 are known to the SMF.

On the other hand, if the PSA relocation leads to DNAI change to a target DNAI that is not known to the SMF, the SMF would consider that the DNAI change from the UP path status where a DNAI applies (e.g. DNAI11 known to the SMF) to a status where no DNAI applies (e.g. DNAI21 not known to the SMF) happens. For example, the UE moves out of the service area of AF1 (that belongs to EDN1) and into the service area of AF2 (that belongs to EDN2). The traffic routing information from AF2 (e.g. TRI3 for app1) is not known to the SMF. So, no information on the target DNAI is available to the SMF. In this condition, the SMF may include the N6 CN tunnel information of the target user plane path in the AF notification. The N6 CN tunnel information can be the N6 traffic routing information for the target PSA (e.g. UPF2) ("N6 traffic routing information for UPF2" in FIG. 2). The N6 traffic routing in the traffic routing information is the related information on the DN side, and the N6 CN tunnel formation in the related information on the CN side that can be the route information (e.g. ipv4 address, or ipv6 address, or port number) of the tunnel end point in the core network on N6 interface (see FIG. 1). The N6 CN tunnel information of the target user plane path (e.g. N6 traffic routing information for the target PSA) can be included in the AF notification as a new parameter. Alternatively, the "target traffic routing information that indicates N6 traffic routing information for the target DNAI" included in the AF notification (when both source DNAI and target DNAI are known to the SMF) can be reused to indicate the N6 CN tunnel information of the target user plane path (when there is no target DNAI known to the SMF).

In step 208, the AF relocation is triggered. The source AF (e.g. AF1) retrieves the target AF (e.g. AF2) based on the information received in step 207. When no target DNAI is included in the AF notification received in step 207 (which implies that the N6 CN tunnel information of the target user plane path would be included in the AF notification), the source AF (e.g. AF1) retrieves the target AF (e.g. AF2) in consideration of the N6 CN tunnel information of the target user plane path (e.g. the N6 traffic routing information (tunnel end point in the core network on N6 interface) for the target PSA (e.g. UPF2)).

In step 209, the source AF (e.g. AF1) replies to the AF notification (e.g. Nsmf_EventExposure_Notify) by sending a response (e.g. by invoking Nsmf_EventExposure_AppRelocationInfo). When the change from the UP path status where a DNAI applies to a status where no DNAI applies happens, if the AF relocation (from the source AF (e.g. AF1) to the target AF (e.g. AF2) succeeds, the response includes N6 traffic routing details corresponding to the N6 CN tunnel information of the target user plane path (the N6 traffic routing information for the target PSA) received in step 207. The N6 traffic routing details belongs to the service area of the target AF (e.g. AF2). Based on existing definition for Type RouteToLocation as described in 29.571, the N6 traffic routing details is associated the target DNAI received in the AF notification. For the case of the AF notification with no target DNAI, it is up to the implementation on how to carry the trafficRoute (the N6 traffic routing details (routeProfId or routeInfo (ipv4 address or ipv6 address or port Number (of the tunnel end point in the data network))) associated to the target UP path, where the Data type for trafficRoute is Type RouteToLocation including DNAI and associated routeInfo) in the positive AfResultInfo within Nsmf_EventExposure_AppRelocationInfo. The routeInfo is set with the relocated N6 traffic routing details associated with the target user plane path and belonging to the service area of the target AF (e.g. AF2). If the corresponding DNAI is available, the corresponding DNAI should be that corresponds to the relocated N6 traffic routing within the service area of the target AF (e.g. AF2). If the corresponding DNAI is not available, the corresponding DNAI may not be included. For example, a specific value for "NO DNAI" may be used. Alternatively, it can be filled with space. Further alternatively, a new parameter with the date type with only the N6 traffic routing detail can be added to be used separately without corresponding DNAI.

In step 210, the SMF deactivates the user plane path to UPF1 for app1 when it receives positive acknowledgement in step 209. In addition, the SMF deactivates AF request with TRI1 (which means the related AF request providing TRI1) (i.e. the AF request from AF1).

In step 211, the SMF activates the user plane path to UFP2 for app1.

In step 212, the target AF (e.g. AF2) provides the traffic routing information (e.g. TRI3) to the core network (CN). The detail of the related procedure is similar to that described in step 201-203.

In step 213, the SMF updates the related information (the traffic routing information (e.g. TRI3 for app1) sent from AF2) by using Npcf_SMPolicyControl_Update procedure.

In step 214, if the N6 traffic routing information for the target PSA (e.g. DNAI21 for app1, or N6 traffic routing details corresponding to DNAI21 for app1) received from the source AF (e.g. AF1) in step 209 is included in the traffic routing information (e.g. TRI3 for app1) from the target AF (e.g. AF2) updated in step 213 (received in step 212), the SMF decides to notify the target AF (e.g. AF2).

In steps 215 and 216, the AF request with TRI3 is activated using the Nsmf_EventExposure procedure. In particular, in step 215, the SMF sends a notification (e.g. Nsmf_EventExposure_Notify) to the target AF (e.g. AF2) to activate the AF request for TRI3 (i.e. DNAI21 for app1). In step 216, the target AF (e.g. AF2) sends an acknowledgement (e.g. Nsmf_EventExposure_AppRelocationInfo) to the SMF. The notification may be early notification, late notification or both. In the case of early notification, the notification is sent before the SMF configuring the UP path towards the new DNAI (possibly through a new PSA). In the case of late notification, the notification is sent before the SMF activating the UP path towards a new DNAI (possibly through a new PSA).

As a whole, in the first embodiment, the SMF sends the N6 CN tunnel information of the target user plane path (e.g. the N6 traffic routing information for the target PSA) to the source AF (e.g. AF1) (in step 207), so that the source AF (e.g. AF1) can retrieve the target AF (e.g. AF2) (in step 208). Further, the source AF may send back the N6 traffic routing details within the service area of the target AF (e.g. AF2) that is associated to DNAI of the target AF (e.g. AF2) to the SMF (in step 209). Moreover, based on the N6 traffic routing details received from the source AF (e.g. AF1) and the traffic routing information sent from the target AF (e.g. AF2), the SMF decides to notify the target AF (e.g. AF2).

In the first embodiment, the SMF sends the target N6 CN tunnel information in step 207 without any request from the UE. According to a variety of the first embodiment, an indication on whether the target N6 CN tunnel information is included in the User Plane Management Events notification when no target DNAI is notified in the User Plane Management Events notification can be further included in the AF request in step 201. In addition, the condition to include the DN access location information may also be included in the AF request. In step 207, the SMF may include the target N6 CN tunnel information in the AF notification, if the indication is included in step 201, or if the indication is included in step 201 and the condition to include the DN access location information (e.g. when the change from the UP path status where a DNAI applies to a status where no DNAI applies happens) is met.

Figure 3:
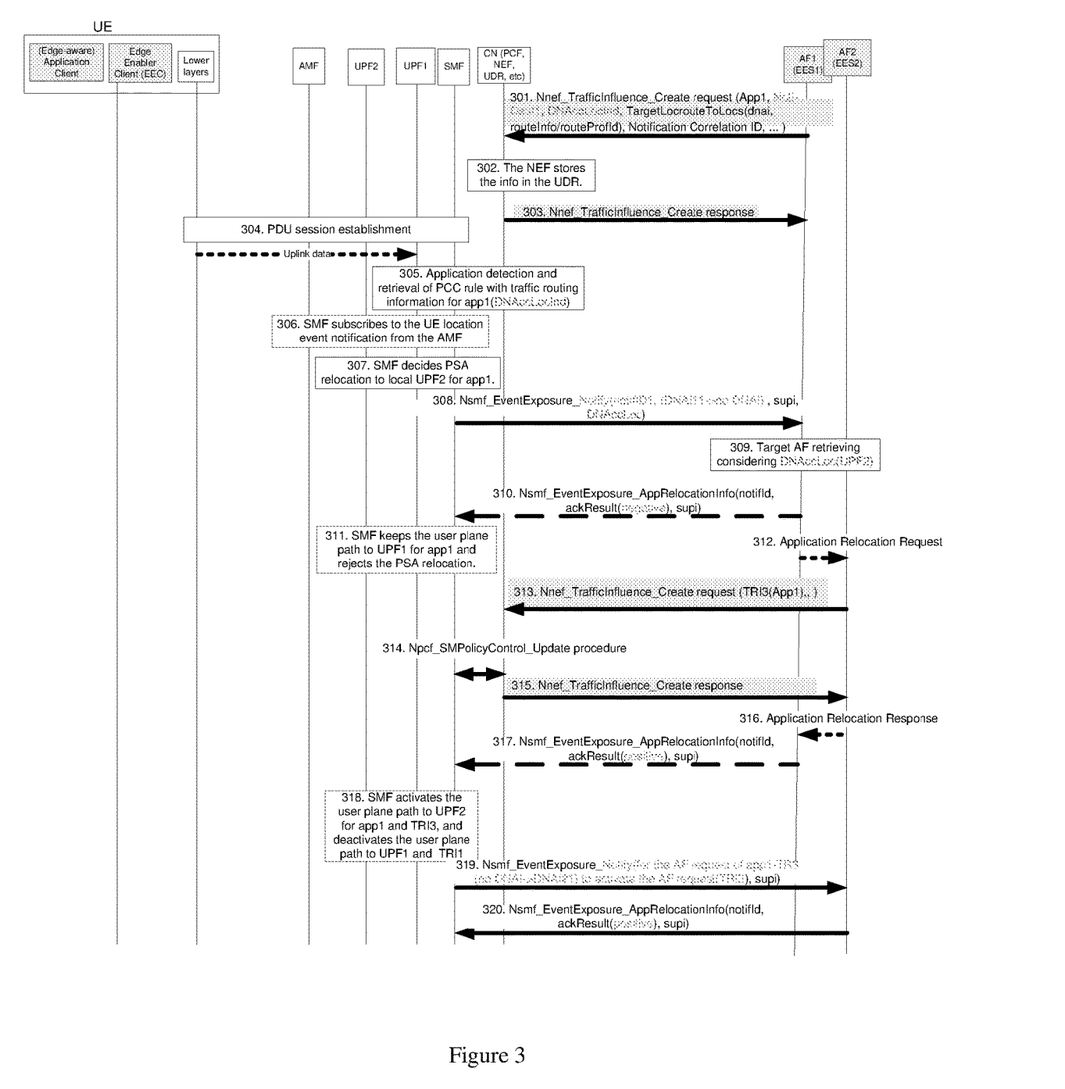
FIG. 3 illustrates procedures according to a second embodiment.

According to a second embodiment illustrated in FIG. 3, a DN Access Location is informed during User Plane Management Events notification.

It is assumed that: (1) ASP (Application Service Provider) deploys the service or application (e.g. app1) into multiple EDNs (Edge Data Networks), in each of which a different AF (e.g. AF1 or AF2) is located; (2) AF sends traffic routing information for the associated EDN for any UE per application (e.g. traffic routing information for app1); and (3) source AF (e.g. AF1) can retrieve target AF (e.g. AF2) according to related procedure for service continuity.

In step 301, an AF request (e.g. Nnef_TrafficInfluence_Create request) is sent from a source AF (e.g. AF1) to the core network (CN) per application without individual UE address (e.g. IP address or MAC address). The AF request may influence UPF selection or reselection and allow routing user traffic to a local access to a data network identified by a DNAI. The AF (e.g. AF1) may send the AF request to PCF (e.g. via NEF to PCF). The AF request includes the identification of the application (App1 in FIG. 3), the traffic routing information (e.g. DNAI11 for app1) (routeToLocs(dnai, routeInfo/routeProfId) in FIG. 3), the Notification Target Address pointing to the NEF or AF (Noti-Dest1 in FIG. 3), and the Notification Correlation ID containing the AF Transaction Internal ID if the AF request includes a notification reporting request for UP path change.

The AF request may further include DNAccLocInd, which means an indication on whether DN access location information is notified in the User Plane Management Events notification when no target DNAI is notified in the User Plane Management Events notification. In addition, the condition to include the DN access location information may also be included (as a new parameter included in the AF request, or as a part of the indication on whether DN access location information is notified). For example, when the change from the UP path status where a DNAI applies to a status where no DNAI applies happens, the DN access location for the target UP path is required to be included in the User Plane Management Events notification. The DN access location information (e.g. the DN access location for the target UP path) can be used by the AF (e.g. source AF1) to identify the location of the served UE for the application.

The DN access location information may be implemented as user location information obtained by SMF. Alternatively, the DN access location information may be implemented as the N6 traffic routing information for the target PSA (as described in the first embodiment). Further alternatively, the DN access location information may be implemented using ECS (EDNS Client Subnet) option for the application obtained in SMF.

In step 302. The NEF stores the traffic routing information included in the AF request into the UDR. Since the AF request has no UE address, the traffic routing information is stored with Data Key=(1) AF Transaction Internal ID, (2) S-NSSAI and DNN, and/or (3) Internal Group Identifier or SUPI.

In step 303, a response message to the AF request (e.g. Nnef_TrfficInfluence_Create response) is sent to the source AF (AF1).

In step 304, the UE initiates a PDU session establishment procedure.

In step 305, the SMF detects the application (e.g. app1) for the UE, and retrieves the traffic routing information for the application (e.g. app1) (e.g. included in PCC rule) via the SM policy procedure using SM Policy Association Establishment procedure during the PDU session establishment procedure, or using SM Policy Control Update procedure based on the application detection.

Optionally (that means if the indication on whether DN access location information is notified in the User Plane Management Events notification is included in the AF request in step 301 and stored in step 302, or if the SMF does it without considering whether the indication on whether DN access location information is notified in the User Plane Management Events notification is included in the AF request), the SMF also retrieves the DN access location information (e.g. for a UE for app1).

In step 306, the SMF subscribes to the UE location event notification from AMF, if the SMF has not done the subscription during the PDU session establishment procedure. When the SMF subscribes to the UE location event notification from the AMF, the SMF requires the AMF to notify the SMF when UE location event happens and further requires the AMF to include DN access location information in the UE location event notification.

In step 307, according to related traffic routing information, PSA relocation to local UPF2 (from UPF1) happens for the application (e.g. app1). When the PSA relocation happens, a condition for AF notification has been met.

In step 308, the SMF sends the AF notification (i.e. User Plane Management Events notification) (e.g. Nsmf_Event-Exposure_Notify) to the source AF (e.g. AF1) that subscribes to AF notification from the SMF. The AF notification includes the traffic routing information retrieved in step 305.

If the PSA relocation leads to DNAI change to a target DNAI that is not known to the SMF, the SMF would consider that the DNAI change from the UP path status where a DNAI applies (e.g. DNAI11 known to the SMF) to a status where no DNAI applies (e.g. DNAI21 not known to the SMF) happens. For example, the UE moves out of the service area of AF1 (that belongs to EDN1) and into the service area of AF2 (that belongs to EDN2). When the indication on whether DN access location information is notified in the User Plane Management Events notification is included in the AF request in step 301, the SMF is required to further include the DN access location information in the AF notification. Alternatively, when the indication on whether DN access location information is notified in the User Plane Management Events notification and a condition to include the DN access location information in the User Plane Management Events notification are included in the AF request in step 301 while the condition is met (e.g. when the change from the UP path status where a DNAI applies to a status where no DNAI applies happens), the SMF is required to further include the DN access location information in the AF notification. Further alternatively, when the change from the UP path status where a DNAI applies to a status where no DNAI applies happens, the SMF decides to further include the DN access location information in the AF notification.

For example, if the UE moves out of the service area of AF1 into the service area of AF2, and if the traffic routing information from AF2 is not yet available in the SMF (i.e. no information on the target DNAI is available to the SMF), the change from the UP path status where a DNAI applies to a status where no DNAI applies happens. Accordingly, the SMF includes the traffic routing information and the DN access location information for the application for the UE. The DN access location information may be user location information obtained by SMF. The DN access location information (if it is implemented as user location information) is obtained by the SMF (e.g. notified from the AMF) from the PDU session establishment procedure or based on the SMF's subscription to the UE location event notification from the AMF in step 306 or during PDU session establishment procedure. The DN access location information (if it is implemented as ECS option) can be alternatively obtained by the SMF and the ECS option is associated with the target PSA information.

In step 309, the AF relocation is triggered. The source AF (e.g. AF1) retrieves the target AF (e.g. AF2) based on the information received in step 308. When no target DNAI is in the AF notification received in step 308 (which implies that the DN access location information is included in the AF notification), the source AF (e.g. AF1) retrieves the target AF (e.g. AF2) in consideration of the DN access location information.

In step 310, the source AF (e.g. AF1) may send a negative reply (e.g. Nsmf_EventExposure_AppRelocationInfo with a negative reply) to the AF notification (e.g. Nsmf_EventExposure_Notify) received in step 308 to the SMF, if the source AF (e.g. AF1) determines that the application relocation cannot be completed successfully on time.

In step 311, upon receiving the negative reply in step 310, the SMF may reject the PSA relocation, and keep the user plane path to UPF1 for app1.

Steps 310 and 311 are optional. That means that if the following steps 312 to 316 can be completed on time, it is not necessary to perform step 310 (accordingly, step 311 is not performed).

In step 312, the source AF (AF1) sends an application relocation request to the target AF (e.g. AF2).

In step 313, after the application relocation between the source AF (e.g. AF1) and the target AF (e.g. AF2) is performed successfully, the target AF (e.g. AF2) sends an AF request (e.g. Nnef_TrafficInfluence_Create request) with traffic routing information (e.g. TRI3) to the core network (CN), e.g. to PCF (e.g. via NEF to PCF).

In step 314, the SMF updates the related information (the traffic routing information (e.g. TRI3) sent from AF2) by using Npcf_SMPolicyControl_Update procedure.

In step 315, a response message the AF request (e.g. Nnef_TrfficInfluence_Create response) is sent to the target AF (e.g. AF2).

In step 316, the target AF (e.g. AF2) sends an application relocation response to the source AF (e.g. AF1) after receiving the response message in step 315.

In step 317, the source AF (e.g. AF1) sends a positive reply to the AF notification (e.g. Nsmf_EventExposure_Notify) received in step 308 to the SMF (e.g. Nsmf_EventExposure_AppRelocationInfo with a positive reply). The positive response includes N6 traffic routing details corresponding to the DN access location information received in step 308. The N6 traffic routing details belongs to the service area of the target AF (e.g. AF2). Based on existing definition for Type RouteToLocation as described in 29.571, the N6 traffic routing details is associated the target DNAI. For the case of the AF notification with no target DNAI, it is up to the implementation on how to carry the trafficRoute (the N6 traffic routing details (routeProfId or routeInfo (ipv4 address or ipv6 address or port number (of the tunnel end point in the data network))) associated to the target UP patch, where the Data type for trafficRoute is Type RouteToLocation including DNAI and associated routeInfo) in the positive AfResultInfo within Nsmf_Event Exposure_AppRelocationInfo. The routeInfo is set with the relocated N6 traffic routing details associated with the target user plane path and belonging to the service area of the target AF (e.g. AF2). If the corresponding DNAI is available, the corresponding DNAI should be that corresponds to the relocated N6 traffic routing within the service area of the target AF (e.g. AF2). If the corresponding DNAI is not available, the corresponding DNAI may not be included. For example, a specific value for "NO DNAI" may be used. Alternatively, it can be filled with space. Further alternatively, a new parameter with the date type with only the N6 traffic routing detail can be added to be used separately without corresponding DNAI.

In step 318, when the SMF receives the positive response in step 317, the SMF deactivates the user plane path to UPF1 for app1 and deactivates the AF request with TRI1. In addition, the SMF activates the user plane path to UPF2 for app1. Moreover, the SMF decides to notify AF2 to activate the AF request with TRI3. The decision to notify AF2 can be made based on the newly activated UP path (via UPF2) and the traffic routing information (e.g. TRI3) received from the target AF (e.g. AF2) in step 313. The decision may alternatively be made if the N6 traffic routing details for the target AF (e.g. AF2) (e.g. DNAI21 for app1, or N6 traffic routing details corresponding to DNAI21 for app1) received from the source AF (e.g. AF1) in step 317 is included in the traffic routing information (e.g. TRI3) received from the target AF (e.g. AF2) in step 313.

In steps 319 and 320, the AF request with TRI3 is activated. In particular, in step 319, the SMF sends a notification (e.g. Nsmf_EventExposure_Notify) to the target AF (e.g. AF2) to activate the AF request for TRI3 (i.e. DNAI21 for app1). In step 320, the target AF (e.g. AF2) sends an acknowledgement (e.g. Nsmf_EventExposure_AppRelocationInfo) to the SMF. The notification may be early notification, late notification or both.

In the above described first and second embodiments, the AF sends traffic routing information for the associated EDN for any UE per application identified by application identifier via NEF. Alternatively, the AF can send traffic routing information for the associated EDN targeting an individual UE address or a group of UEs, and the AF can send traffic routing information for the traffic identified by traffic filtering information (e.g. 5 Tuple). For example, the AF can send traffic routing information for the associated EDN targeting an individual UE address or a group of UEs per application or per traffic identified by traffic filtering information. Depending on the AF deployment, the AF may send the AF request to PCF directly, or via the NEF. If the AF sends the AF request directly to the PCF, the AF invokes Npcf_PolicyAuthorization service and the PCF responds to the AF. In this case, the AF traffic routing information and indication on whether the target DN access location information is notified are included in Npcf_PolicyAuthorization request and sent to the PCF directly (note that the AF traffic routing information and indication on whether the target DN access location information is notified are sent via NEF in the above described first and second embodiments), and the DN access location information is notified by the SMF to the AF, with the same manner as that described in the first and second embodiments.

The SMF stands for Session Management Function, which provides the functionalities related to managing the PDU session. The AF stands for the Application Function, which interacts with the 3GPP Core Network in order to provide services for cooperation between the application side and the network side. The SMF and the AF are components of a network architecture. If the SMF and/or the AF are named with other names, similar logic of the method can be applied too.

Figure 4:
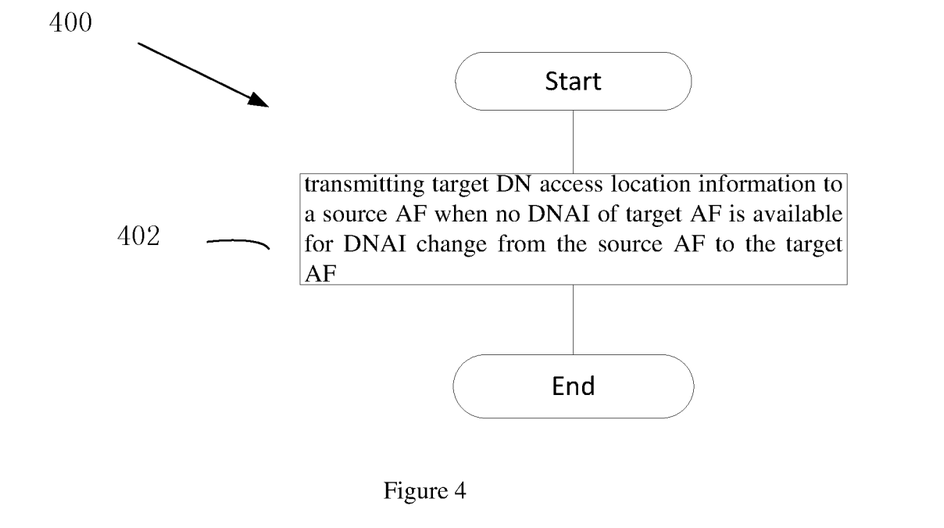
FIG. 4 illustrates is a schematic flow chart diagram illustrating an embodiment of a method.

FIG. 4 is a schematic flow chart diagram illustrating an embodiment of a method 400 according to the present application. In some embodiments, the method 400 is performed by a network function such as an SMF or a network function with an SMF. In certain embodiments, the method 400 may be performed by a processor executing program code, for example, a microcontroller, a microprocessor, a CPU, a GPU, an auxiliary processing unit, a FPGA, or the like.

The method 400 may include 402 transmitting target DN access location information to a source AF when no DNAI of target AF is available for DNAI change from the source AF to the target AF.

Preferably, the method further comprises receiving N6 traffic routing details of the target AF from the source AF. The method may further comprise receiving traffic routing information from the target AF; and deciding notification to the target AF according to the received N6 traffic routing details of the target AF and the received traffic routing information. The method may further comprise receiving from the source AF an indication on whether the target DN access location information is notified, wherein the target DN access location information is transmitted when the indication is received. The target DN access location information may be target N6 CN tunnel information which is the route information of the tunnel end point in core network on N6 interface, or user location information obtained by the SMF.

Figure 5:
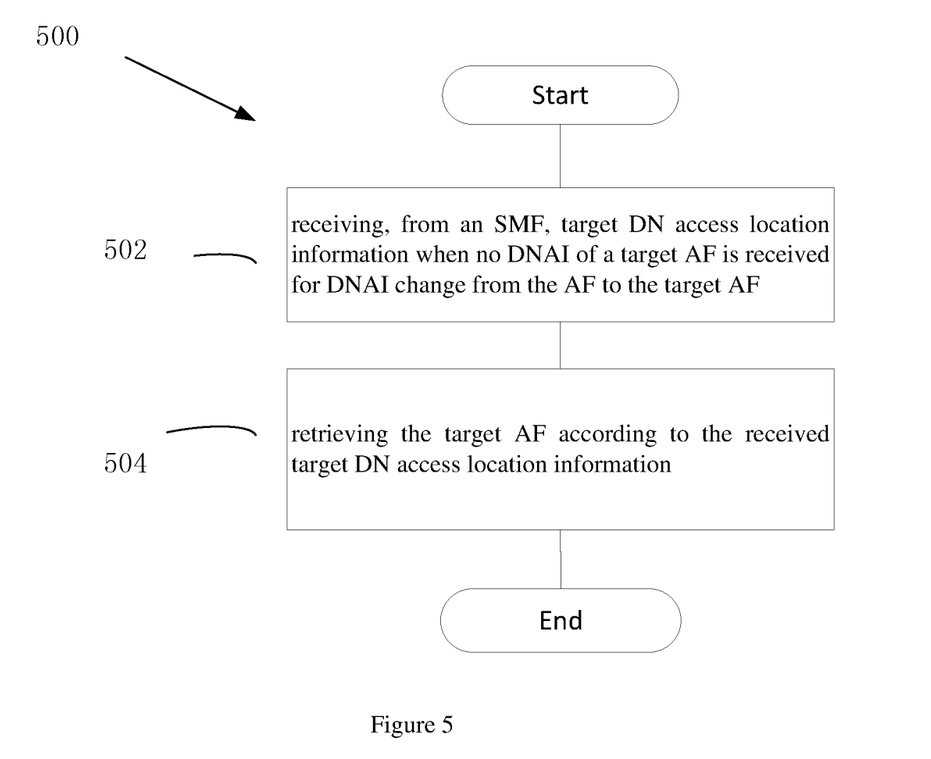
FIG. 5 is a schematic flow chart diagram illustrating a further embodiment of a method.

FIG. 5 is a schematic flow chart diagram illustrating an embodiment of a method 500 according to the present application. In some embodiments, the method 500 is performed by a network function such as an AF or a network function with an AF. In certain embodiments, the method 500 may be performed by a processor executing program code, for example, a microcontroller, a microprocessor, a CPU, a GPU, an auxiliary processing unit, a FPGA, or the like.

The method 500 may include 502 receiving, from an SMF, target DN access location information when no DNAI of a target AF is received for DNAI change from the AF to a target AF; and 504 retrieving the target AF according to the received target DN access location information.

Preferably, the method may further comprise transmitting N6 traffic routing details of the target AF to the SMF. The method may further comprise transmitting an indication on whether the target DN access location information is notified. The method may further comprise transmitting traffic routing information of the target AF. The target DN access location information may be target N6 CN tunnel information which is the route information of the tunnel end point in core network on N6 interface, or user location information obtained by the SMF.

Figure 6:
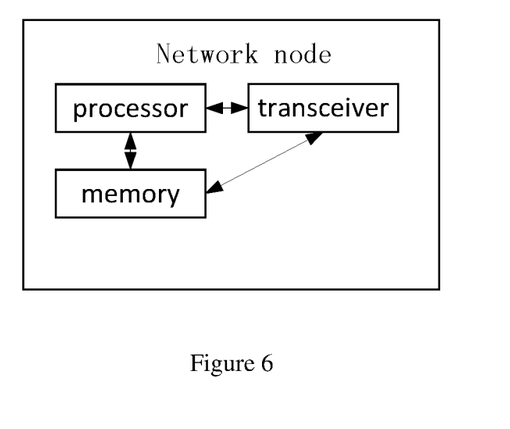
FIG. 6 is a schematic block diagram illustrating another apparatus according to one embodiment.

FIG. 6 is a schematic block diagram illustrating apparatuses according to one embodiment.

The network function or network node (e.g. SMF or AF) includes a processor, a memory, and a transceiver. The processor implements a function, a process, and/or a method which are proposed in FIG. 4 or 5.

The SMF comprises a processor and a transmitter coupled to the processor, wherein the processor is configured to transmit, via the transmitter, target DN access location information when no DNAI of target AF is available for DNAI change from a source AF to the target AF.

Preferably, the SMF further comprise a receiver configured to receive N6 traffic routing details of the target AF from the source AF. The receiver may further be configured to receive traffic routing information from the target AF; and the processor is further configured to decide notification to the target AF according to the received N6 traffic routing details of the target AF and the received traffic routing information. The receiver may further be configured to receive from the source AF an indication on whether the target DN access location information is notified, wherein the target DN access location information is transmitted when the indication is received. The target DN access location information may be target N6 CN tunnel information which is the route information of the tunnel end point in core network on N6 interface, or user location information obtained by the SMF.

The AF comprises a processor; and a receiver coupled to the processor, wherein the processor is configured to receive, via the receiver, target DN access location information when no target DNAI is received for DNAI change from a source AF to the target AF; and to retrieve target AF according to the received target DN access location information.

Preferably, the AF may further comprise a transmitter configured to transmit N6 traffic routing details of the target AF to the SMF. The transmitter may further be configured to transmit an indication on whether the target DN access location information is notified. The transmitter may further be configured to transmit traffic routing information of the target AF. The target DN access location information may be target N6 CN tunnel information which is the route information of the tunnel end point in core network on N6 interface, or user location information obtained by the SMF.

Layers of a radio interface protocol may be implemented by the processors. The memories are connected with the processors to store various pieces of information for driving the processors. The transceivers are connected with the processors to transmit and/or receive message or information. Needless to say, the transceiver may be implemented as a transmitter to transmit the information and a receiver to receive the information.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of performing a network function, the method comprising:
   receiving, from a session management function (SMF) of a network architecture, target data network (DN) access location information when no DN Access Identifier (DNAI) of a target application function (AF) is received for DNAI change from the AF to the target AF; and
   retrieving the target AF according to the received target DN access location information.

2. The method of claim 1, further comprising:
   transmitting N6 traffic routing details of the target AF to the SMF.

3. The method of claim 1, further comprising:
   transmitting an indication on whether the target DN access location information is notified.

4. The method of claim 1, further comprising:
   transmitting traffic routing information of the target AF.

5. The method of claim 1, wherein, the target DN access location information is target N6 core network (CN) tunnel information which is route information of a tunnel end point in core network on N6 interface.

6. The method of claim 1, wherein, the target DN access location information is user location information obtained by the SMF.

7. A method of performing a network function, the method comprising:
   transmitting target data network (DN) access location information to a source application function (AF) of a network architecture when no DN Access Identifier (DNAI) of target AF is available for DNAI change from the source AF to the target AF.

8. The method of claim 7, further comprising:
   receiving N6 traffic routing details of the target AF from the source AF.

9. The method of claim 7, further comprising:
   receiving from the source AF an indication on whether the target DN access location information is notified,
   wherein the target DN access location information is transmitted when the indication is received.

10. The method of claim 8, further comprising:
    receiving traffic routing information from the target AF; and
    deciding notification to the target AF according to the received N6 traffic routing details of the target AF and the received traffic routing information.

11. The method of claim 7, wherein, the target DN access location information is target N6 core network (CN) tunnel information which is route information of a tunnel end point in core network on N6 interface.

12. The method of claim 7, wherein, the target DN access location information is user location information obtained by a session management function (SMF).

13. An apparatus for performing a network function, the apparatus comprising:
    at least one memory; and
    at least one processor coupled with the at least one memory and configured to cause the apparatus to:
       receive target data network (DN) access location information when no DN Access Identifier (DNAI) of a target application function (AF) is received for DNAI change from the AF to the target AF; and
       retrieve the target AF according to the received target DN access location information.

14. An apparatus for performing a network function, the apparatus comprising:
    at least one memory; and
    at least one processor coupled with the at least one memory and configured to cause the apparatus to:
       transmit target data network (DN) access location information when no DN Access Identifier (DNAI) of a target application function (AF) of a network architecture is available for DNAI change from a source AF to the target AF.

15. The apparatus of claim 14, further comprising:
    receiving N6 traffic routing details of the target AF from the source AF.

16. The apparatus of claim 13, further comprising:
    transmitting N6 traffic routing details of the target AF to a session management function (SMF).

17. The apparatus of claim 13, further comprising:
    transmitting an indication on whether the target DN access location information is notified.

18. The apparatus of claim 13, further comprising:
    transmitting traffic routing information of the target AF.

19. The apparatus of claim 13, wherein, the target DN access location information is target N6 core network (CN) tunnel information which is route information of a tunnel end point in core network on N6 interface.

20. The apparatus of claim 13, wherein, the target DN access location information is user location information obtained by a session management function (SMF).

* * * * *